(12) United States Patent
Luo et al.

(10) Patent No.: US 10,539,931 B2
(45) Date of Patent: Jan. 21, 2020

(54) TIME-SERIES DATA ANALYSIS DEVICE

(71) Applicant: FANUC CORPORATION, Yamanashi (JP)

(72) Inventors: Wei Luo, Yamanashi (JP); Junichi Tezuka, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/298,008

(22) Filed: Mar. 11, 2019

(65) Prior Publication Data

US 2019/0286070 A1    Sep. 19, 2019

(30) Foreign Application Priority Data

Mar. 13, 2018 (JP) .................. 2018-045725

(51) Int. Cl.
  *G05B 1/01* (2006.01)
  *G05B 23/02* (2006.01)

(52) U.S. Cl.
  CPC .......... *G05B 1/01* (2013.01); *G05B 23/0264* (2013.01); *G05B 23/0272* (2013.01); *G05B 23/0286* (2013.01)

(58) Field of Classification Search
  CPC .... G08C 17/02; G08C 2201/93; G08C 17/00; G08C 2201/20; G08C 2201/91; G08C 19/28; G08C 2201/10; G08C 2201/34; G08C 2201/40; G08C 2201/50
  USPC .......................................................... 340/5.1
  See application file for complete search history.

(56) References Cited

U.S. PATENT DOCUMENTS

| | | | |
|---|---|---|---|
| 9,503,772 B2* | 11/2016 | Azam | H04N 21/42201 |
| 9,575,808 B1* | 2/2017 | Yamala | G06F 9/45558 |
| 10,417,108 B2* | 9/2019 | Tankersley | G06F 3/04847 |
| 10,418,811 B2* | 9/2019 | Konya | G05B 15/02 |
| 10,427,239 B2* | 10/2019 | Becker | B23K 9/0953 |

FOREIGN PATENT DOCUMENTS

| | | |
|---|---|---|
| JP | 2003-75472 | 3/2003 |
| JP | 2006-92241 | 4/2006 |
| JP | 2009-104502 | 5/2009 |
| JP | 2017-133879 | 8/2017 |

* cited by examiner

*Primary Examiner* — Mark S Blouin
(74) *Attorney, Agent, or Firm* — Wenderoth, Lind & Ponack, L.L.P.

(57) ABSTRACT

To provide a time-series data analysis device which allows to compare time-series data easily.
A time-series data analysis device analyzes the time-series data output by a machine tool, the time-series data analysis device including a time-series data acquisition unit configured to acquire the plurality of time-series data including operation conditions and operation results of the machine tool, a classification unit configured to classify the plurality of time-series data according to their respective operation conditions, a display control unit configured to perform control for displaying the plurality of time-series data according to the respective operation condition into which data was classified in the form of a list, and a calculation unit configured to calculate differences in the operation results for a plurality of time-series data selected from the plurality of time-series data included in one operation condition into which data was classified, wherein the display control unit performs control for displaying the calculated differences.

5 Claims, 5 Drawing Sheets

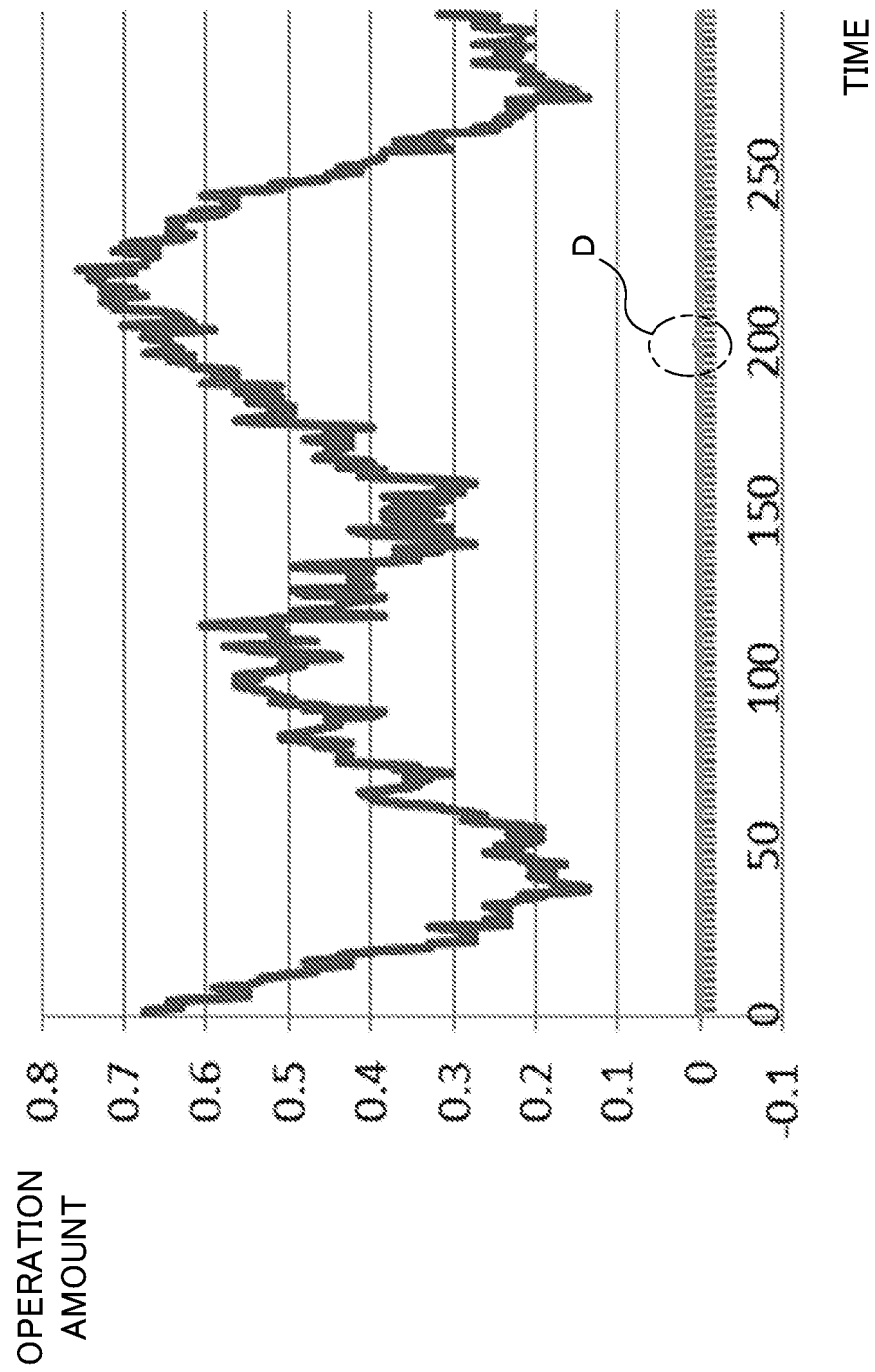

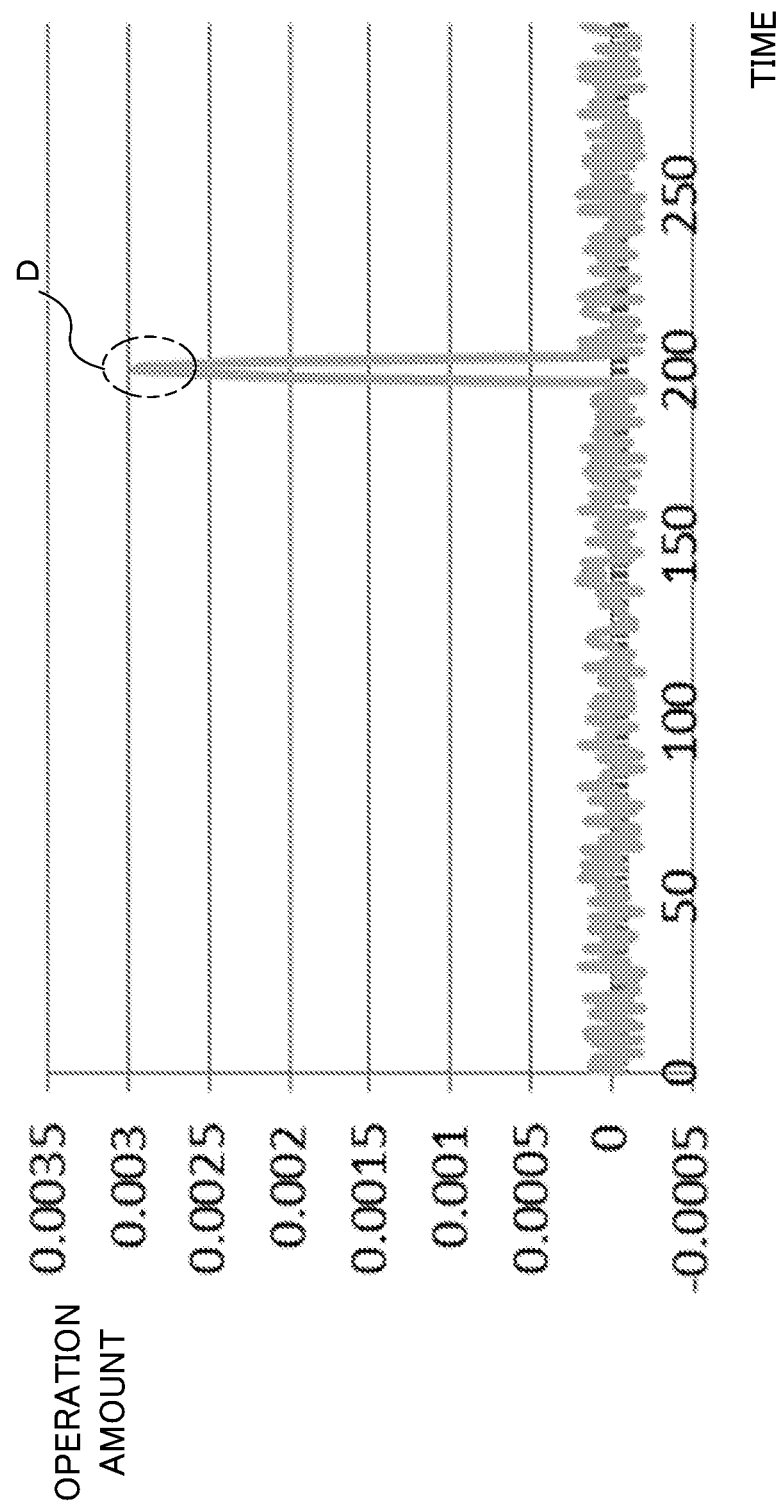

TIME-SERIES DATA ANALYSIS DEVICE

This application is based on and claims the benefit of priority from Japanese Patent Application No. 2018-045725, filed on 13 Mar. 2018, the content of which is incorporated herein by reference.

BACKGROUND OF THE INVENTION

Field of the Invention

The present invention relates to a time-series data analysis device.

Related Art

Conventionally, analysis of time-series data obtained by operation of a machine tool has been practiced. The operation state of a machine tool can be grasped by analyzing time-series data. The grasped operation state of a machine tool can be utilized for failure prediction and for investigation of causes for failures.

As such a device for analyzing time-series data, a device for grasping the operation state of a machine tool by comparing times-series data with other time-series data is proposed (refer to, for example, Patent Document 1 to Patent Document 4).

Patent Document 1: Japanese Unexamined Patent Application, Publication No. 2003-75472
Patent Document 2: Japanese Unexamined Patent Application, Publication No. 2006-92241
Patent Document 3: Japanese Unexamined Patent Application, Publication No. 2009-104502
Patent Document 4: Japanese Unexamined Patent Application, Publication No. 2017-133879

SUMMARY OF THE INVENTION

Each of the devices disclosed in Patent Document 1 to Patent Document 4 is capable of detecting a difference in time-series data between one machine tool and other machine tools by comparing time-series data with other time-series data. In this way, the state of one machine tool is able to be determined.

On the other hand, in order to compare time-series data, the time-series data that are to be compared need to be specified. In order to specify the time-series data, the work of searching the time-series data that are to be specified from a plurality of time-series data as well as the work of extracting the time-series data that are to be specified have been required. Moreover, in cases where the time-series data that are to be compared do not have a large difference therebetween, an immense amount of work was required in order to detect the difference therebetween.

The purpose of the present invention is to provide a time-series data analysis device which allows time-series data to be compared easily.

(1) The present invention relates to a time-series data analysis device (for example, "a time-series data analysis device 1" to be described below) configured to analyze time-series data output by a machine tool (for example, "a machine tool 100" to be described below), the time-series data analysis device including: a time-series data acquisition unit (for example, "a time-series data acquisition unit 13" to be described below) configured to acquire the plurality of time-series data including operation conditions and operation results of the machine tool, a classification unit (for example, "a classification unit 14" to be described below) configured to classify the plurality of time-series data according to operation conditions, a display control unit (for example, "a display control unit 17" to be described below) configured to perform control for displaying the plurality of time-series data according to the operation condition into which data was classified in the form of a list, and a calculation unit (for example, "a calculation unit 15" to be described below) configured to calculate differences in the operation results for a plurality of time-series data selected from the plurality of time-series data included in one operation condition into which data was classified, wherein the display control unit performs control for displaying the calculated differences.

(2) In the time-series data analysis device according to (1), the display control unit may perform control for superimposing and displaying the plurality of selected time-series data as a graph.

(3) In the time-series data analysis device according to (1) or (2), the time-series data acquisition unit may acquire the time-series data including operation dates and times serving as the operation conditions, and the display control unit may perform control for displaying the operation dates and times of the plurality of time-series data in the form of a list.

(4) In the time-series data analysis device according to any one of (1) to (3), the calculation unit may calculate, by treating one time-series data out of the plurality of selected time-series data as the reference data, the differences of the plurality of time-series data in one operation condition into which data was classified, relative to the reference data, and may further sort the plurality of time-series data including the one operation condition into which data was classified, based on the differences, while the display control unit may perform control for displaying the plurality of sorted time-series data in the form of a list.

(5) In the time-series data analysis device according to (4), the calculation unit may sort the plurality of time-series data included in one operation condition into which data was classified, based on either the maximum value among absolute values of the differences between the reference data and the other time-series data or a mean-square value of the differences.

The present invention enables to provide a time-series data analysis device allowing time-series data to be compared easily.

BRIEF DESCRIPTION OF THE DRAWINGS

FIG. 4 is a graph indicating differences and superimposed time-series data to be displayed by the time-series data analysis device according to one embodiment.

FIG. 5 is a graph indicating enlarged differences displayed by the time-series data analysis device according to one embodiment.

DETAILED DESCRIPTION OF THE INVENTION

Figure 1:
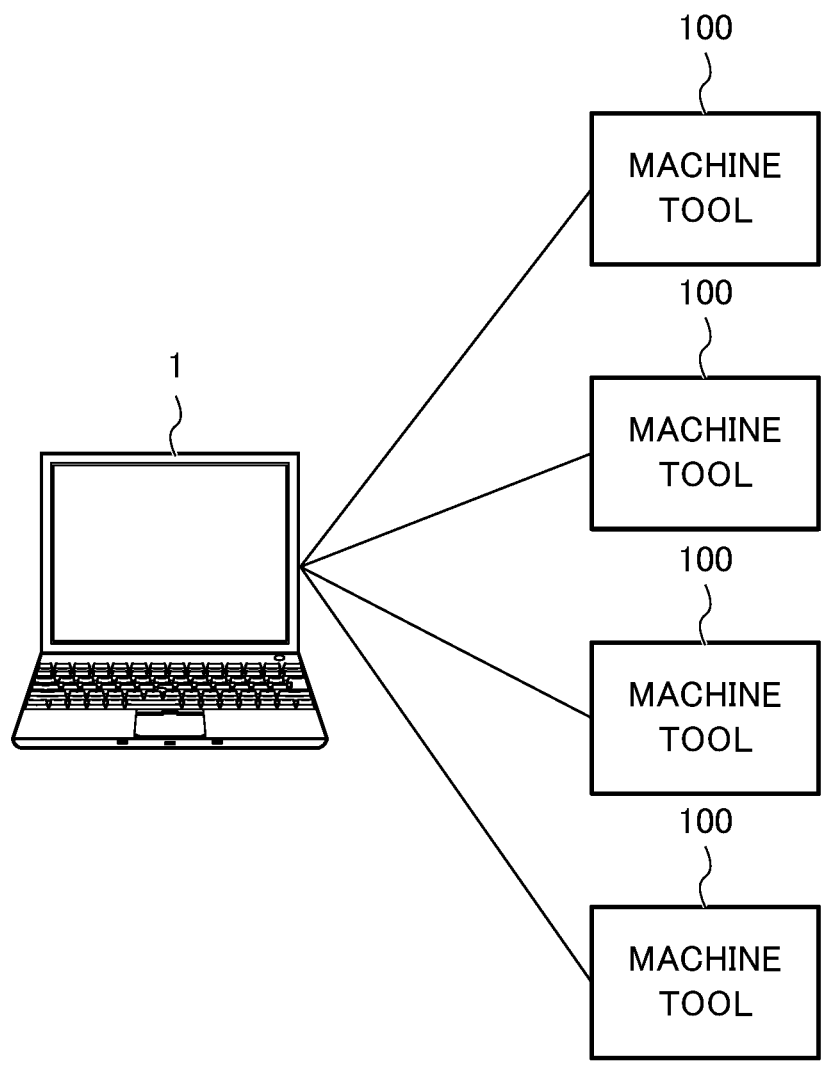
FIG. 1 is a schematic diagram illustrating an environment in which a time-series data analysis device according to one embodiment of the present invention is connected.

A time-series data analysis device 1 according to one embodiment of the present invention will be described below with reference to FIG. 1 to FIG. 5. As shown in FIG. 1, the time-series data analysis device 1 according to the present embodiment is connected to a plurality of machine tools 100 so as to be able to transmit and receive data. The time-series data analysis device 1 acquires and collects the time-series data output by the plurality of machine tools 100. The time-series data analysis device 1 displays the collected time-series data in the state where they are comparable with other time-series data. In this manner, the time-series data analysis device 1 is able to display the information helpful for failure prediction, investigation of failure cause, optimization of operation state, and the like, with respect to the machine tools 100.

The time-series data herein is the information including the operation conditions and the operation results of the machine tools 100. The operation conditions of the machine tools 100 herein are the conditions indicating the operation environment of the machine tools 100, such as sequence number, tool number, program number, and operation date and time (time of day). The operation results herein are the information indicating rotation torque of a motor, operation speed, operation distance, operation current value, and the like as operation amount with respect to a time axis, obtained as a result of the machine tools 100 operating based on the operation conditions. In the description of the present embodiment below, sequence numbers and operation times of day are used as operation conditions by way of example.

Figure 2:
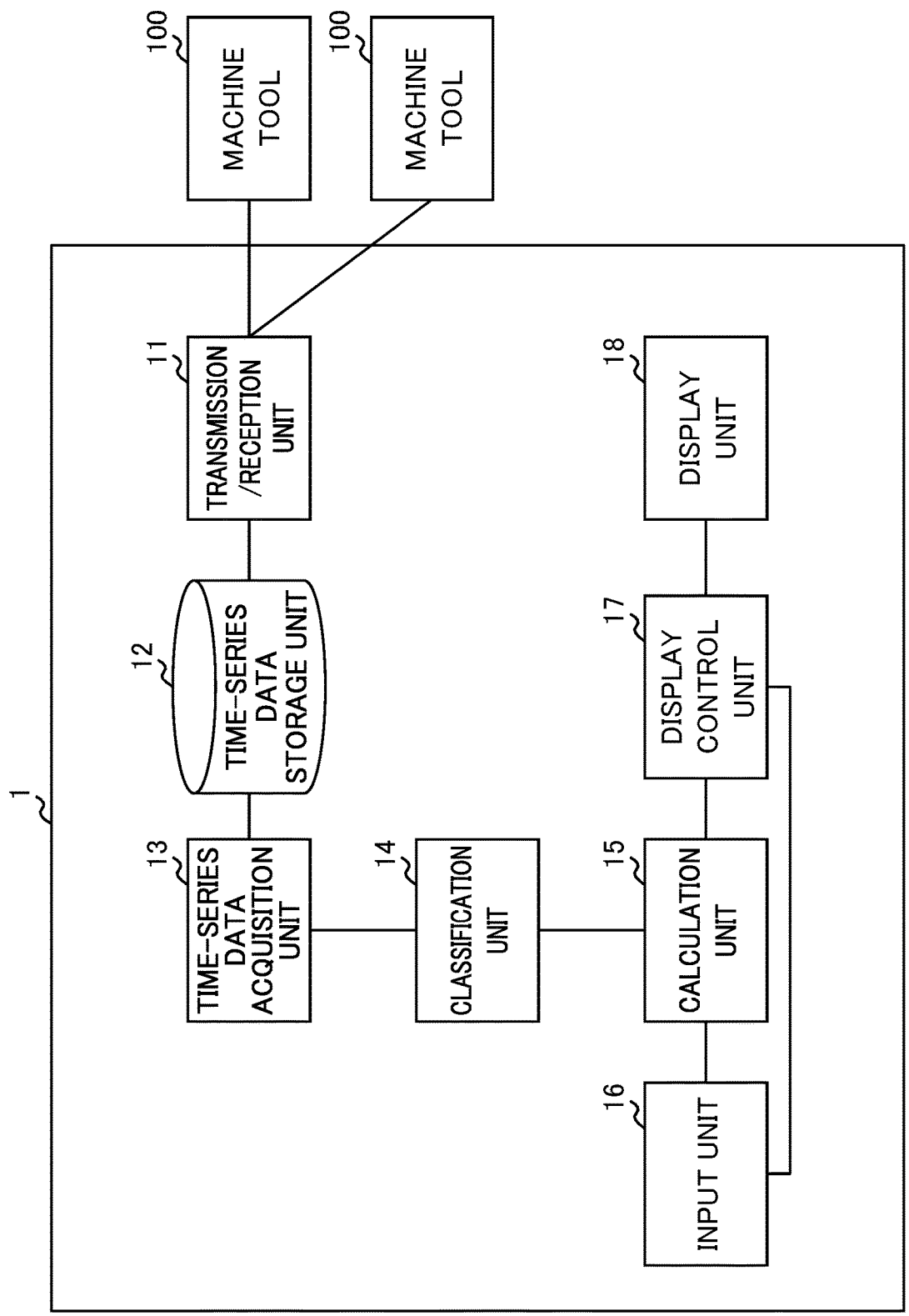
FIG. 2 is a block diagram illustrating the time-series data analysis device according to one embodiment.

The time-series data analysis device 1 is, for example, an information processing apparatus such as a personal computer. As shown in FIG. 2, the time-series data analysis device 1 includes a transmission/reception unit 11, a time-series data storage unit 12, a time-series data acquisition unit 13, a classification unit 14, a calculation unit 15, an input unit 16, a display control unit 17, and a display unit 18.

The transmission/reception unit 11 is an input/output interface. The transmission/reception unit 11 is connected to the plurality of machine tools 100. Specifically, the transmission/reception unit 11 is configured so as to receive time-series data from the plurality of machine tools 100.

The time-series data storage unit 12 is, for example, a secondary storage medium such as a hard disk or a memory. The time-series data storage unit 12 stores the plurality of time-series data. Specifically, the time-series data storage unit 12 stores the plurality of time-series data received by the transmission/reception unit 11.

The time-series data acquisition unit 13 acquires the plurality of time-series data. Specifically, the time-series data acquisition unit 13 acquires the plurality of time-series data including the operation conditions and the operation results of the machine tools 100. The time-series data acquisition unit 13 acquires the plurality of time-series data by reading out the time-series data stored in the time-series data storage unit 12. The time-series data acquisition unit 13 further acquires the time-series data including operation dates and times as operation conditions.

The classification unit 14 classifies the plurality of time-series data according to their respective operation conditions. For example, the classification unit 14 classifies the time-series data including the operation conditions indicated with the same sequence number as the time-series data included in one operation condition. The classification unit 14 classifies the plurality of read-out time-series data according to their respective operation conditions.

The calculation unit 15 calculates differences D (refer to FIG. 4) in the operation results for the plurality of time-series data selected out of the plurality of time-series data included in one operation condition into which data was classified. For example, the calculation unit 15 treats one time-series data out of the plurality of selected time-series data included in one operation condition into which data was classified as the reference data. The calculation unit 15 calculates the differences D of the plurality of time-series data in one operation condition into which data was classified, relative to the reference data. The calculation unit 15 sorts the plurality of time-series data based on the differences D. For example, the calculation unit 15 sorts the plurality of time-series data included in one operation condition into which data was classified, based on the either the maximum value among absolute values of the differences D between the reference data and the other time-series data or the mean-square value of the differences D. Further, the calculation unit 15 sorts, for example, the plurality of time-series data included in one operation condition into which data was classified in descending order of the differences D.

The input unit 16 is, for example, an input interface such as a mouse or a keyboard. The input unit 16 accepts input such as of selection of times-series data and selection of operation conditions. The input unit 16 further accepts input such as that of display of the differences D and graphical display of time-series data.

The display control unit 17 performs control for displaying the plurality of time-series data classified according to their respective operation conditions in the form of a list. For example, the display control unit 17 performs control for displaying the plurality of time-series data sorted by the calculation unit 15 in the form of a list. The display control unit 17 further performs control for displaying the graph of the plurality of selected time-series data superimposed on each other. The display control unit 17 performs control for displaying the calculated differences D.

The display unit 18 is, for example, a display device such as a display. The display unit 18 is configured so as to display the information controlled by the display control unit 17.

The operation of the time-series data analysis device 1 is described below. The transmission/reception unit 11 collects time-series information from the plurality of machine tools 100. The transmission/reception unit 11 stores the collected time-series information in the time-series data storage unit 12.

The time-series data acquisition unit 13 acquires the plurality of time-series data stored in the time-series data storage unit 12. The time-series data acquisition unit 13 transmits the plurality of acquired time-series data to the classification unit 14.

Figure 3:
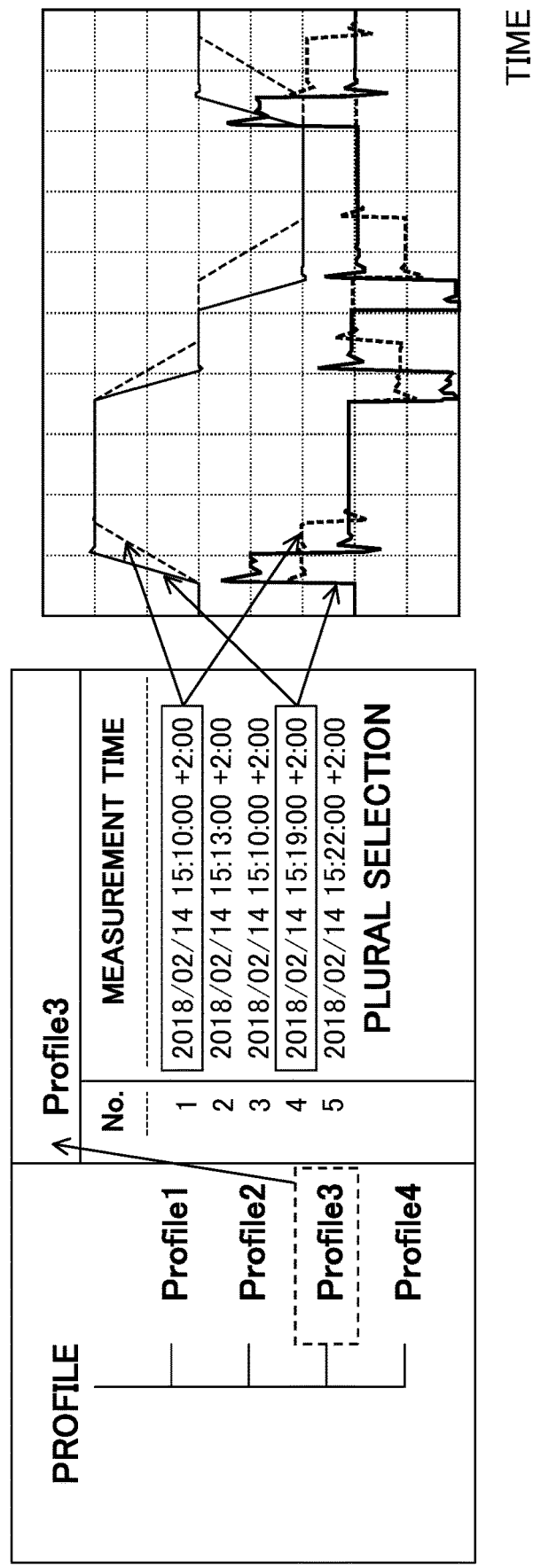
FIG. 3 is a schematic diagram illustrating time-series data in a list displayed by the time-series data analysis device according to one embodiment.

The classification unit 14 classifies the plurality of time-series data by each operation condition. For example, the classification unit 14 acquires the operation condition input to the input unit 16 and classifies the plurality of time-series data according to the acquired operation conditions. In the present embodiment, the classification unit 14 classifies the plurality of time-series data according to the respective sequence number serving as operation conditions. For example, as shown in FIG. 3, the display control unit 17 performs control for displaying the sequence numbers on the display unit 18 as "Profile1," "Profile2," and "Profile3".

The calculation unit 15 then acquires the operation condition input to the input unit 16. For example, the calculation unit 15 acquires the sequence number which was selected by a click of a mouse. The calculation unit 15 creates the list of the plurality of time-series data included in the acquired sequence number. The calculation unit 15 transmits the created list to the display control unit 17.

The display control unit 17 performs control for displaying the created list on the display unit 18. For example, as shown in FIG. 3, the display control unit 17 displays, in the form of a list, the operation dates and times (measurement times) of the plurality of time-series data included in the created list.

The calculation unit 15 then acquires a plurality of time-series data to calculate the differences D. Specifically, the calculation unit 15 acquires the plurality of time-series data input to the input unit 16. For example, the calculation unit 15 acquires the selection input of the plurality of time-series data from the list shown in FIG. 3. The calculation unit 15 calculates the differences D for the operation results for the plurality of acquired time-series data. Specifically, the calculation unit 15 calculates, by treating one of the selected time-series data as reference data, the differences D of the plurality or time-series data in one operation condition into which data was classified, relative to the reference data. The calculation unit 15 further sorts the plurality of time-seers data including one operation condition into which data was classified, based on the differences D. The calculation unit 15 sorts the plurality of time-series data included in one operation condition into which data was classified, based on, for example, either the maximum value among the absolute values of the differences D between the reference data and the other time-series data or the mean-square value of the differences D. The calculation unit 15 transmits the plurality of selected time-series data, the differences D, and the sorted time-series data to the display control unit 17.

As shown in FIG. 3, the display control unit 17 performs control for displaying the graph in which the plurality of time-series data acquired from the calculation unit 15 are superimposed on each other on the display unit 18. In the present embodiment, the display control unit 17 superimposes and displays two operation results included in two time-series data, respectively. The display control unit 17 further performs control for displaying the plurality of sorted time-series data in the form of a list on the display unit 18.

Further, as shown in FIG. 4, the display control unit 17 performs control for displaying the superimposed time-series data and the differences b on the display unit 18. For example, the display control unit 17 performs control for displaying the superimposed time-series data and the differences D on the display unit 18 by acquiring the input to display the differences D that were input to the input unit 16.

As shown in FIG. 5, the display control unit 17 further performs control for enlarging and displaying the differences D on the display unit 18. For example, the display control unit 17 controls the display unit 18 to enlarge and display the position of the difference D specified by the input unit 16.

The time-series data analysis device 1 according to the embodiment described above produces the following effects.

(1) The time-series data analysis device 1 according to the present embodiment is configured to analyze time-series data output by the machine tools 100, the time-series data analysis device 1 including: the time-series data acquisition unit 13 configured to acquire the plurality of time-series data including operation conditions and operation results of the machine tools 100, the classification unit 14 configured to classify the plurality of time-series data according to their respective operation conditions, the display control unit 17 configured to perform control for displaying the plurality of time-series data according to the respective operation conditions into which data was classified in the form of a list, and the calculation unit 15 configured to calculate differences D in the operation results for a plurality of time-series data selected from the plurality of time-series data included in one operation condition into which data was classified, wherein the display control unit 17 performs control for displaying the calculated differences D. Since the differences D of the plurality of selected time-series data are displayed, the differences of the plurality of time-series data can be easily determined. This facilitates the analysis of time-series data.

(2) The display control unit 17 performs control for superimposing and displaying the plurality of selected time-series data in the form of a graph. This enables comparison of the plurality of time-series data, thereby further facilitating the analysis of time-series data.

(3) The time-series data acquisition unit 13 acquires the time-series data including operation dates and times serving as the operation conditions, and the display control unit 17 performs control for displaying the operation dates and times of the plurality of time-series data in the form of a list. This enables to display the operation dates and times at which the plurality of time-series data has been obtained, thereby enabling to perform time-series analysis. Accordingly, the plurality of time-series data can be analyzed in more detail.

(4) The calculation unit 15 calculates, by treating one time-series data which would serve as a reference in one operating condition into which data was classified as the reference data, the differences D of the plurality of time-series data in one operation condition into which data was classified, relative to the reference data, and further sorts the plurality of time-series data based on the differences D, while the display control unit 17 performs control for displaying the plurality of sorted time-series data in the form of a list. In this way, based on the magnitudes of the differences D of other time-series data relative to the reference data, a list of the time-series data can be displayed. Accordingly, time-series data greatly deviating from the reference data can be determined instantly. Since there is no need to search from the time-series data, analysis can be performed more efficiently.

(5) The calculation unit 15 sorts the plurality of time-series data included in one operation condition into which data was classified, based on either the maximum value in absolute values among the differences D between the reference data and the other time-series data or the mean-square value of the differences D. In this way, time-series data having larger differences relative to the reference data can be displayed in the form of a list. Accordingly, the analysis can be performed more efficiently.

The preferred embodiments of the time-series data analysis system of the present invention have been described so far. However, the present invention is not limited to the above-described embodiments, and modifications can be made suitably.

For example, in the above embodiments, the reference data was described one among the plurality of selected time-series data, but the present invention is not limited thereto. For example, the time-series data analysis device 1 may include a reference data storage unit (not shown) configured to store the time-series data serving as an appropriate model for each operation condition. The classification unit 14 may acquire the reference data based on the operation condition into which data was classified.

In the above embodiments, the time-series data analysis device 1 was described to be connected to the plurality of machine tools 100, but the present invention is not limited thereto. The time-series data analysis device 1 may be connected to one machine tool 100, and may acquire and analyze a plurality of time-series data.

In the above embodiments, the time-series data acquisition unit 13 was described to acquire the plurality of time-series data from the time-series data storage unit 12, but the present invention is not limited thereto. For example, the time-series data acquisition unit 13 may acquire time-series data from the plurality of machine tools 100 in real time.

1 TIME-SERIES DATA ANALYSIS DEVICE
13 TIME-SERIES DATA ACQUISITION UNIT
14 CLASSIFICATION UNIT
15 CALCULATION UNIT
17 DISPLAY CONTROL UNIT
100 MACHINE TOOL

What is claimed is:

1. A time-series data analysis device configured to analyze time-series data output from a machine tool, the time-series data analysis device comprising:
    time-series data acquisition unit configured to acquire a plurality of time-series data including operation conditions and operation results of the machine tool;
    classification unit configured to classify the plurality of time-series data according to respective operation conditions;
    display control unit configured to perform control for displaying the plurality of time-series data in the form of list according to the respective operation conditions into which data was classified; and
    calculation unit configured to calculate differences in the operation results for a plurality of time-series data selected from the plurality of time-series data included in one operation condition into which data was classified, wherein
    the display control unit performs control for displaying the calculated differences.

2. The time-series data analysis device according to claim 1, wherein
    the display control unit performs control for superimposing and displaying the plurality of selected time-series data in the form of a graph.

3. The time-series data analysis device according to claim 1, wherein
    the time-series data acquisition unit acquires time-series data including operation dates and times as the operation conditions, and
    the display control unit performs control for displaying the operation dates and times of the plurality of time-series data in the form of a list.

4. The time-series data analysis device according to claim 1, wherein
    the calculation unit calculates, by treating one time-series data which would serve as reference in one operation condition into which data was classified as reference data, the differences of the plurality of time-series data in one operation condition into which data was classified, relative to the reference data, and further sorts the plurality of time-series data based on the differences, and
    the display control unit performs control for displaying the plurality of sorted time-series data in the form of a list.

5. The time-series data analysis device according to claim 4, wherein
    the calculation unit sorts the plurality of time-series data included in one operation condition into which data was classified, based on either the maximum value among absolute values of the differences between the reference data and the other time-series data or a mean-square value of the differences.

* * * * *